US011714020B2

(12) United States Patent
Steltner

(10) Patent No.: US 11,714,020 B2

(45) Date of Patent: Aug. 1, 2023

(54) DIAGNOSTIC DEVICE, CONTROL DEVICE, FLUID SYSTEM AND METHOD FOR DIAGNOSING LEAKAGE OF PRESSURIZED FLUID

(71) Applicant: Festo SE & Co. KG, Esslingen (DE)

(72) Inventor: Holger Steltner, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 272 days.

(21) Appl. No.: 16/928,555

(22) Filed: Jul. 14, 2020

(65) Prior Publication Data

US 2021/0018394 A1 Jan. 21, 2021

(30) Foreign Application Priority Data

Jul. 18, 2019 (DE) ......................... 102019210600.5

(51) Int. Cl.

*G01M 3/32* (2006.01)

*G05D 16/20* (2006.01)

(52) U.S. Cl.

CPC .......... *G01M 3/32* (2013.01); *G05D 16/2013* (2013.01)

(58) Field of Classification Search

CPC ............................ G01M 3/32; G05D 16/2013

See application file for complete search history.

(56) References Cited

U.S. PATENT DOCUMENTS 5,873,230 A * 2/1999 Wussmann ......... G01M 3/2815 19/236

6,678,584 B2 * 1/2004 Junk ................. G05B 23/0278 700/282

2003/0208305 A1 11/2003 Junk et al.

FOREIGN PATENT DOCUMENTS

DE 19652372 A1 6/1998

* cited by examiner

*Primary Examiner* — Eric Keasel

(74) *Attorney, Agent, or Firm* — Hoffmann & Baron, LLP

(57) ABSTRACT

A diagnostic device for diagnosing leakage of pressurized fluid from at least one pressure chamber to which a pressurized fluid can be applied. The diagnostic device is configured to diagnose the pressurized fluid leakage on the basis of at least one pressure control actuating signal for controlling a valve arrangement provided for closed-loop pressure control of the pressure chamber.

17 Claims, 1 Drawing Sheet

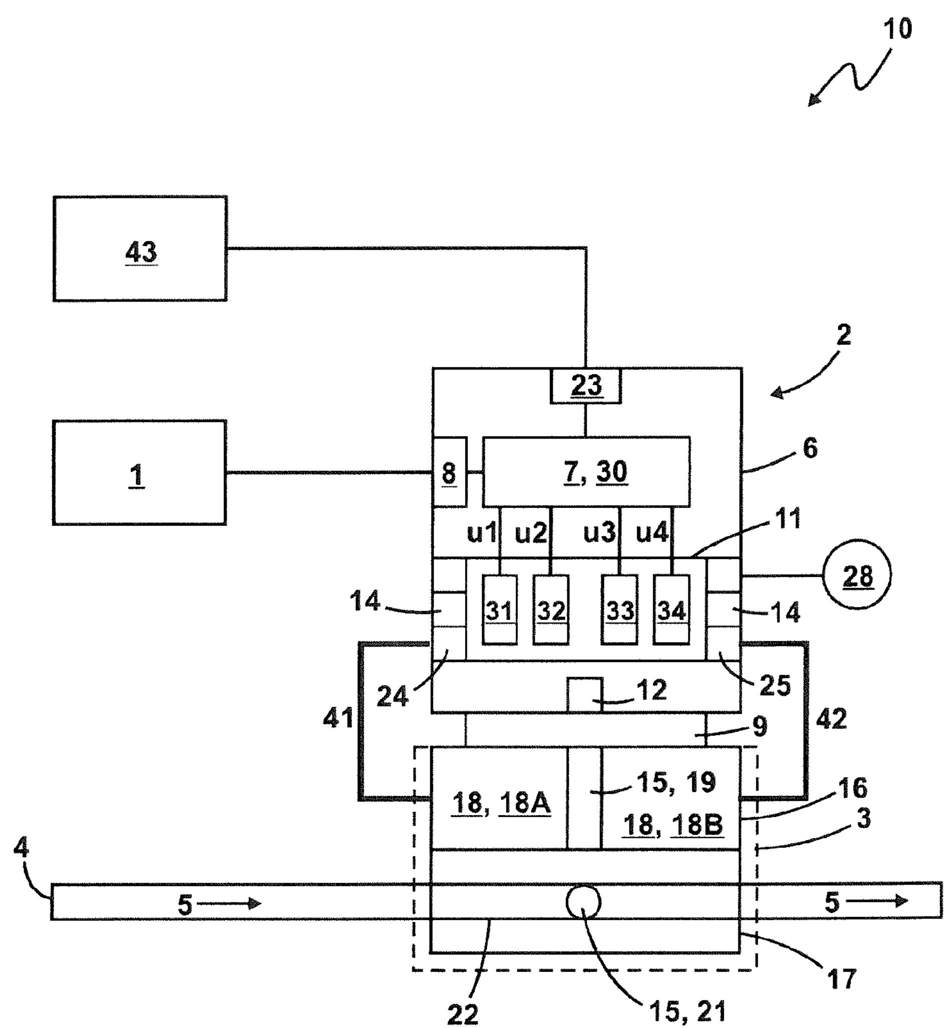
10
43
2
23
1
8
7, 30
6
u1 u2 u3 u4
11
28
14
31 32 33 34
14
24
12
25
41
9
42
18, 18A
15, 19
16
18, 18B
3
4
5
5
17
22
15, 21

DIAGNOSTIC DEVICE, CONTROL DEVICE, FLUID SYSTEM AND METHOD FOR DIAGNOSING LEAKAGE OF PRESSURIZED FLUID

BACKGROUND OF THE INVENTION

The invention pertains to a diagnostic device for diagnosing leakage of pressurized fluid from at least one pressure chamber to which a pressurized fluid can be applied. The leakage of pressurized fluid may also be referred to as pressurized fluid leakage.

SUMMARY OF THE INVENTION

It is an object of the invention to provide a diagnostic device with which leakage of pressurized fluid can be diagnosed in an efficient manner.

The diagnostic device is configured to diagnose the pressurized fluid leakage on the basis of at least one pressure control actuating signal. The pressure control actuating signal is used to control a valve arrangement which is provided for closed-loop pressure control of the pressure chamber. The pressure control actuating signal may also be referred to as pressure control signal.

If there is a pressurized fluid leakage from the pressure chamber—i.e. if pressurized fluid flows out of the pressure chamber in an undesired manner, for example due to a lack of impermeability of the pressure chamber and/or a component fluidically connected to the pressure chamber—this affects the pressure control actuating signal. The pressure control actuating signal must compensate for the pressurized fluid leakage; i.e. cause the valve arrangement to supply a larger amount of pressurized fluid to the pressure chamber or to discharge a smaller amount of pressurized fluid from the pressure chamber in order to achieve or maintain (despite the pressurized fluid leakage) a pressure target value specified by the closed-loop pressure control. Consequently, there is a correlation between the pressure control actuating signal and the presence/absence of pressurized fluid leakage, so that the pressurized fluid leakage can be diagnosed on the basis of the pressure control actuating signal. As no additional sensors are required for this, this can be done very efficiently. A lack of impermeability may also be referred to as a lack of sealing.

The invention further pertains to a control device comprising a diagnostic device described herein and the valve assembly. The control device is adapted to perform the closed-loop pressure control and to provide the at least one pressure control actuating signal as part of the pressure control.

The invention further relates to a fluidic system comprising a control device described herein and a fluidic actuator. The control device is configured to carry out closed-loop pressure control of the fluidic actuator and to provide, within the closed-loop pressure control, at least one pressure control actuating signal for the control of the valve arrangement. The diagnostic device is configured to diagnose the pressurized fluid leakage on the basis of the at least one pressure control actuating signal.

The invention further pertains to a method for diagnosing pressurized fluid leakage from a pressure chamber which can be pressurized with pressurized fluid, comprising the step of: diagnosing the pressurized fluid leakage on the basis of at least one pressure control actuating signal for the control of a valve arrangement provided for closed-loop pressure control of the pressure chamber.

According to a preferred embodiment, the method is further adapted in correspondence to a diagnostic device, control device and/or fluidic system described herein.

BRIEF DESCRIPTION OF THE DRAWINGS

Further exemplary details and exemplary embodiments are explained below with reference to the FIGURE.

FIG. 1 shows a schematic representation of a fluidic system.

DETAILED DESCRIPTION

FIG. 1 shows a fluidic system 10, which shall represent an exemplary application context for the diagnostic device 30. As an example, the diagnostic device 30 is part of a control device 2. Alternatively, the diagnostic device 30 may also be provided on its own, i.e. without the other components of the fluidic system 10.

The fluidic system 10 comprises at least one pressure chamber 18—here exemplarily a first pressure chamber 18A and a second pressure chamber 18B—which can be pressurized with a pressurized fluid. The pressure chamber 18 is exemplarily part of a fluidic actuator 3. The fluidic system 10 is preferably a pneumatic system. The pressurized fluid is preferably compressed air.

A valve arrangement 11 is provided to provide a closed-loop pressure control of the pressure chamber 18. The valve arrangement 11 is controlled by means of at least one pressure control actuating signal—here exemplarily by means of a first pressure control actuating signal u1, a second pressure control actuating signal u2, a third pressure control actuating signal u3 and/or a fourth pressure control actuating signal u4. As an example, the valve arrangement 11 is part of the control device 2. The control device 2 is expediently configured to carry out the closed-loop pressure control of the fluidic actuator 3, in particular of the pressure chamber 18, and to provide the at least one pressure control actuating signal for the control of the valve arrangement 11 as part of the closed-loop pressure control. The control device 2 may also be referred to as closed-loop control device 2.

The diagnostic device 30 is configured to diagnose the pressurized fluid leakage on the basis of the at least one pressure control actuating signal.

Further exemplary details are explained below.

The fluidic system 10 is in particular an industrial facility, preferably a process technology facility.

The fluidic system 10 comprises exemplarily the control device 2, the fluidic actuator 3 and a pressurized fluid source 28. Optionally, the fluidic system 10 further comprises a fluid line arrangement 4, a superordinate controller 1 and/or an external computer unit 43, for example a cloud server, a PC and/or a mobile device.

The fluidic actuator 3 includes an actuator member 15, which can be moved into different positions by applying pressurized fluid to the pressure chamber 18. The fluidic actuator 3 serves in particular to influence the flow (for example a mass or volume flow) of a fluid 5, in particular a process fluid, through the fluid line arrangement 4, in particular to selectively stop or enable the flow and/or to adjust its flow velocity. The influencing of the flow of the fluid 5 is effected via the actuator member 15 of the fluidic actuator 3.

The fluidic actuator 3 includes a valve device. The valve device is in particular designed as a process valve unit. The fluidic actuator 3, in particular the valve device, preferably comprises a fluidic drive unit 16 and a valve fitting 17, in particular a process valve.

The fluidic actuator 3, exemplarily the fluidic drive unit 16, comprises at least one pressure chamber 18, which can be pressurized with the pressurized fluid by means of the valve arrangement 11. As an example, the fluidic actuator 3, in particular the drive unit 16, comprises the first pressure chamber 18A and the second pressure chamber 18B, which can be pressurized with the pressurized fluid separately from each other by means of the valve arrangement 11. The first pressure chamber 18A is fluidically connected via a first fluid line 41 with the valve arrangement 11, exemplarily with a first fluid line port 24 of the control device 2. The second pressure chamber 18B is fluidically connected via a second fluid line 42 with the valve arrangement 11, for example with a second fluid line port 25 of the control device 2.

The fluidic actuator 3 is preferably of double-acting design and accordingly comprises the two pressure chambers 18A and 18B. According to an alternative design, the fluidic actuator may be of single-acting design and accordingly comprise only one pressure chamber 18 for actuating the actuator member 15.

The fluidic actuator 3, for example the fluidic drive unit 16, further includes a control member 19, which can be changed in its position by applying pressurized fluid to the pressure chamber 18. According to a possible design, the actuator member 15 comprises the control member 19. The control member 19 is a piston, for example. As an example, the control member 19 separates the two pressure chambers 18A, 18B from each other.

The fluidic actuator 3, exemplarily the valve fitting 17, expediently comprises a valve member 21. The actuator member 15 expediently comprises the valve member 21. Exemplarily, the valve member 21 is located in a fluid line section 22, through which the fluid 5 flows. The valve member 21 is expediently coupled to the control member 19 and is expediently moved together with the control member 19 when the control member 19 is actuated. By pressurizing the pressure chamber 18 with the pressurized fluid, the position of the valve member 21 can be changed, in particular via its coupling to the control member 19.

According to a possible design, an arrangement comprising the control device 2 and the fluidic actuator 3 is provided. Expediently, the control device 2 is arranged at, in particular on, the fluidic actuator 3 and is in particular attached to the fluidic actuator 3 by means of a mechanical interface 9.

The superordinate controller 1 is a programmable logic controller, PLC, for example. The superordinate controller 1 is in particular configured to provide a position target value (and/or a pressure target value) for the control device 2. As an example, the superordinate controller 1 provides the position target value and/or the pressure target value as an analog current value, in particular as an analog current value in the range of 4-20 mA.

The control device 2 is, for example, a positioner. The term "positioner" refers in particular to a closed-loop positioner. The control device 2 is in particular designed for use in industrial automation, in particular in process automation. The control device 2 is a field device, in particular for industrial use. As an example, the control device 2 is a 2-wire device, especially a 2-wire positioner. Expediently, the control device 2 is connected to the superordinate controller 1 via two conductors and receives, via these two conductors, a position target value and/or the electrical energy used to operate the control device 2.

As an example, the control device 2 comprises a housing 6, which is preferably cubic or cylindrical.

As an example, the control device 2 comprises the valve arrangement 11. The control device 2 is configured to provide, via the valve arrangement 11, the pressurized fluid for the control of the fluidic actuator 3. The valve arrangement 11 is expediently located in the housing 6. The valve arrangement 11 comprises exemplarily several valves for the pressurized fluid supply and/or pressurized fluid discharge of the first pressure chamber 18A and/or the second pressure chamber 18B. The valves of the valve arrangement 11 comprise in particular a first pressurized fluid supply valve 31, a first pressurized fluid discharge valve 32, a second pressurized fluid supply valve 33 and/or a second pressurized fluid discharge valve 34.

Expediently, the valve arrangement 11 includes the first pressurized fluid supply valve 31, via which the pressurized fluid can be supplied to the first pressure chamber 18A. As an example, the first pressurized fluid supply valve 31 is connected between the first pressure chamber 18A, in particular the first fluid line port 24, and the pressurized fluid source 28, so that the pressurized fluid from the pressurized fluid source 28 can be supplied to the first pressure chamber 18A via the first pressurized fluid supply valve 31.

Expediently, the valve arrangement 11 includes the first pressurized fluid discharge valve 32, through which the pressurized fluid can be discharged from the first pressure chamber 18A. As an example, the first pressurized fluid discharge valve 32 is connected between the first pressure chamber 18A, in particular the first fluid line port 24, and a pressurized fluid sink, for example the environment of the control device 2, in particular the atmosphere, so that the pressurized fluid can be discharged from the first pressure chamber 18A into the pressurized fluid sink via the first pressurized fluid discharge valve 32.

Expediently, the valve arrangement 11 includes the second pressurized fluid supply valve 33, via which the pressurized fluid can be supplied to the second pressure chamber 18B. As an example, the second pressurized fluid supply valve 33 is connected between the second pressure chamber 18B, in particular the second fluid line port 25, and the pressurized fluid source 28, so that the pressurized fluid from the pressurized fluid source 28 can be supplied to the second pressure chamber 18B via the second pressurized fluid supply valve 33.

Expediently, the valve arrangement 11 includes the second pressurized fluid discharge valve 34, through which the pressurized fluid can be discharged from the second pressure chamber 18B. As an example, the second pressurized fluid discharge valve 34 is connected between the second pressure chamber 18B, in particular the second fluid line port 25, and a pressurized fluid sink, for example the environment of the control device 2, in particular the atmosphere, so that the pressurized fluid can be discharged from the second pressure chamber 18B into the pressurized fluid sink via the second pressurized fluid discharge valve 34.

The control device 2 comprises a position sensor device 12. The control device 2 is expediently configured to detect, by means of the position sensor device 12, an actual position of the actuator member 15 and to provide the actual position as an actual position value. The position sensor device 12 is expediently arranged in or on the housing 6.

The control device 2 comprises a pressure sensor device 14. The control device 2 is configured to detect, by means of the pressure sensor device 14, an actual pressure of the pressurized fluid provided by the control device 2, and to provide the actual pressure as an actual pressure value. As an example, the control device 2 is configured to detect, by means of the pressure sensor device 14, a first actual pressure value assigned to the first pressure chamber 18A and a second actual pressure value assigned to the second pressure chamber 18B. The pressure sensor device 14 is expediently located in or on the housing 6.

The control device 2 further includes, as an example, the mechanical interface 9 for attaching the control device 2 to the fluidic actuator 3. The mechanical interface 9 is located, as an example, on the housing 6.

The control device 2 further comprises, as an example, a computer unit 7, for example a microcontroller, on which a closed-loop controller program, in particular a closed-loop controller algorithm, is provided, expediently for providing the closed-loop pressure control of the pressure chamber 18, and/or a closed-loop position control explained below. The computer unit 7 is located in particular in the housing 6.

Expediently, the control device 2 is designed to calculate, as part of the closed-loop pressure control, a deviation between an actual pressure value detected in particular by means of the pressure sensor device 14 and a target pressure value, and to provide the at least one pressure control actuating signal on the basis of the deviation, so as to minimize the deviation between the actual pressure value and the target pressure value.

According to a possible design, the control device 2 is configured to carry out a respective closed-loop pressure control for each of the two pressure chambers 18A, 18B—i.e. for the first pressure chamber 18A a first closed-loop pressure control of a first actual pressure value to a first target pressure value and for the second pressure chamber 18B a second closed-loop pressure control of a second actual pressure value to a second target pressure value.

Furthermore, the control device 2 can be configured to closed-loop control, within the closed-loop pressure control, a differential pressure between the two pressure chambers 18A, 18B to a specified target pressure value.

The computer unit 7 is configured to provide the at least one pressure control actuating signal—here exemplarily the several pressure control actuating signals u1, u2, u3, u4—within the closed-loop pressure control and to control the valve arrangement 11 by means of the one or several pressure control actuating signals.

The at least one pressure control actuating signal, in particular the several pressure control actuating signals u1, u2, u3, u4 are expediently calculated in the computer unit 7 as part of the closed-loop pressure control and are output as one or more electrical signals to the valve arrangement 11. Preferably, each pressure control actuating signal specifies a position, in particular a degree of opening, of a respective valve of the valve arrangement 11. The first pressure control actuating signal u1 specifies the position, in particular the degree of opening, of the first pressurized fluid supply valve 31. The second pressure control actuating signal u2 specifies the position, in particular the degree of opening, of the first pressurized fluid discharge valve 32. The third pressure control actuating signal u3 determines the position, in particular the degree of opening, of the second pressurized fluid supply valve 33. The fourth pressure control actuating signal u4 specifies the position, in particular the degree of opening, of the second pressurized fluid discharge valve 34. Each of the pressure control actuating signals u1, u2, u3, u4 can expediently assume signal values within a specified value interval. Each of the pressure control actuating signals u1, u2, u3, u4 provides the position of a respective valve of valve arrangement 11 over time. Expediently, each of the pressure control actuating signals u1, u2, u3, u4 is a signal over time; expediently, each signal value of each pressure control actuating signal u1, u2, u3, u4 is assigned to a time value.

Each pressure control actuating signal u1, u2, u3, u4 may also be referred to as a non-fluidic pressure control actuating signal or as an electrical pressure control actuating signal. The term pressure control actuating signal means in particular an internal signal present within the computer unit 7, for example at software level, and/or an electrical pressure control actuating signal output by the computer unit 7, for example an analogue electrical signal or a digital electrical signal.

The diagnostic device 30 is provided as an example as a software component on the control device 2, in particular on the computer unit 7. Alternatively or additionally, the diagnostic device 30 can also be provided on the superordinate controller 1 and/or the external computer unit 43. As an example, the control device 2 is configured to transmit the at least one pressure control actuating signal, in particular the several pressure control actuating signals u1, u2, u3, u4, to the superordinate controller 1 and/or the external computer unit 43. As an example, the control device 2 comprises a communication interface 23 for communication with the external computer unit 43.

The diagnostic device 30 is expediently configured to carry out the diagnosis of compressed air leakage when the control device 2 is in a pressure control mode and in particular when the target position and the actual position of the actuator member 15 are constant. The diagnostic device 30 is configured in particular to detect and evaluate the pressure control actuating signals u1, u2, u3 and u4 generated in order to maintain, in the pressure chambers 18A, 18B, the current pressure level (according to the target pressure value) and to detect the compressed air leakage on the basis of the evaluation.

For example, the pressure control actuating signals for controlling the valves of the valve arrangement 11 are provided with signal values between 0 and 1, where 0 means "valve completely closed" and 1 means "valve completely open".

As an example, the following pressure control actuating signals are present: The first pressure control actuating signal u1 for supplying air to the first pressure chamber 18A and the second pressure control actuating signal u2 for discharging air from the first pressure chamber 18A. If the fluidic actuator 3 is double-acting, the third pressure control actuating signal u3 is used for supplying air to the second pressure chamber 18B and the fourth pressure control actuating signal u4 for discharging air from the second pressure chamber 18B.

The diagnostic device 30 is expediently configured to calculate, on the basis of one, several or all of the pressure control actuating signals u1, u2, u3, u4, one or more indicators which indicate how often and/or how much supplying of air and/or discharging of air of the one or more pressure chambers 18 is/are carried out to achieve the specified target pressure value.

For example, such an indicator can be calculated by integrating and/or low-pass filtering the at least one pressure control actuating signal. The indicator can then be used to determine the pressurized fluid leakage. The diagnostic device 30 is preferably configured to diagnose the pressurized fluid leakage on the basis of an integral and/or low-pass filtering of the at least one pressure control actuating signal. In particular, the diagnostic device is configured to subject the integral to a low-pass filtering and to diagnose the leakage on the basis of the low-pass filtered integral.

In particular, the integral is a temporal integral and can be calculated as follows:

$$U_1 = \int_{t1}^{t2} u_1 dt$$

The low-pass filtering can expediently be calculated as follows:

$$\tilde{U}_1 = TP(U_1)$$

The above formulas refer to the first pressure control actuating signal u1 and preferably apply in corresponding manner to the other pressure control actuating signals u2, u3, u4. This results in $\tilde{U}_2$ as low-pass filtered integral of u2, $\tilde{U}_3$ as low-pass filtered integral of u3 and/or $\tilde{U}_4$ as low-pass filtered integral of u4.

The diagnostic device 30 is preferably configured to diagnose the pressurized fluid leakage on the basis of the several pressure control actuating signals u1, u2, u3, u4 for the aforementioned different valves of the valve arrangement 11.

In particular, the diagnostic device 30 is configured to diagnose at least one of several possible causes of pressurized fluid leakage on the basis of the at least one pressure control actuating signal or the several pressure control actuating signals u1, u2, u3, u4. The diagnostic device 30 is thus preferably configured to distinguish different pressurized fluid leakage causes—in particular the below explained first pressurized fluid leakage cause, second pressurized fluid leakage cause and/or third pressurized fluid leakage cause—on the basis of the at least one pressure control actuating signal or the several pressure control actuating signals u1, u2, u3, u4.

Preferably, the diagnostic device 30 is configured to diagnose the first cause of pressurized fluid leakage on the basis of the first pressure control actuating signal u1. The first pressurized fluid leakage cause is, for example, a lack of impermeability of the first pressure chamber 18A, a lack of impermeability of the first fluidic connection 41 between the first pressurized fluid supply valve 31 and the first pressure chamber 18A and/or a lack of impermeability of the first pressurized fluid discharge valve 32 provided for the pressurized fluid discharge from the first pressure chamber 18A.

In particular, the diagnostic device 30 is configured to detect the first cause of pressurized fluid leakage in response to high or increasing values of the indicator $\tilde{U}_1$ in particular in response to the fact that the indicator $\tilde{U}_1$ exceeds a predetermined threshold and/or that a specified increase in the indicator $\tilde{U}_1$ is present.

High values of $\tilde{U}_1$ and/or an increase of $\tilde{U}_1$ over time may indicate leakage of pressurized fluid from the pressure chamber 18A (or leakage of pressurized fluid at the fluidic connection 41 between the first pressurized fluid supply valve 31 and the first pressure chamber 18A, or a lack of impermeability of the pressurized fluid discharge valve 32 in a closed state).

The diagnostic device 30 is in particular configured to diagnose a second cause of pressurized fluid leakage on the basis of the second pressure control actuating signal u2. The second cause of pressurized fluid leakage comprises a lack of impermeability of the first pressurized fluid supply valve 31, which is provided for a pressurized fluid supply into the first pressure chamber 18A.

In particular, the diagnostic device 30 is configured to detect the second cause of pressurized fluid leakage in response to high or increasing values of the indicator $\tilde{U}_2$ in particular in response to the fact that the indicator $\tilde{U}_2$ exceeds a predetermined threshold and/or that a specified increase in the indicator $\tilde{U}_2$ is present.

High or increasing values of $\tilde{U}_2$ indicate a lack of impermeability of the first pressurized fluid supply valve 31 in a closed state.

According to a preferred embodiment, the diagnostic device 30 is configured to determine the first and/or second cause of pressurized fluid leakage with respect to the second pressure chamber 18B in a corresponding manner, for example on the basis of the indicators $\tilde{U}_3$ and/or $\tilde{U}_4$.

The diagnostic device 30 is expediently further configured to diagnose a third pressurized fluid leakage cause on the basis of the first pressure control actuating signal u1 and the fourth pressure control actuating signal u4. The third pressurized fluid leakage cause includes a lack of impermeability between the first pressure chamber 18A and the second pressure chamber 18B.

In particular, the diagnostic device 30 is configured to detect the third cause of pressurized fluid leakage in response to increased values of $\tilde{U}_1$ in combination with increased values of $\tilde{U}_4$, i.e. in response to the fact that both $\tilde{U}_1$ as well as $\tilde{U}_4$ exceed a respective predetermined threshold value.

If, in the case of a double-acting fluidic actuator 3, increased values of $\tilde{U}_1$ and $\tilde{U}_4$ occur in combination, this indicates an internal leakage, i.e. a lack of sealing between the pressure chambers 18A, 18B.

Correspondingly, this applies to the case that increased values of $\tilde{U}_2$ and $\tilde{U}_3$ occur in combination and the diagnostic device 30 is expediently configured to detect this case.

According to a preferred design, the diagnostic device 30 is configured to perform the diagnosis of the pressurized fluid leakage and/or the determination of the various causes of pressurized fluid leakage on the basis of one or more quantities derived from one or more of the above mentioned indicators. In particular, the diagnostic device 30 is configured to use this quantity instead of the indicators $\tilde{U}_1$, $\tilde{U}_2$, $\tilde{U}_2$ and/or $\tilde{U}_4$.

The mentioned quantities are in particular differences, ratios and/or other quantities derived therefrom of the indicators $\tilde{U}_1$, $\tilde{U}_2$, $\tilde{U}_3$ and/or $\tilde{U}_4$. For example, the mentioned quantities include: $\tilde{U}_1 - \tilde{U}_2$, $\tilde{U}_1 / \tilde{U}_2$ and/or $\tilde{U}_1 / \tilde{U}_3$. The diagnostic device is expediently configured to compensate for and/or minimize the influence of application-specific variable operating conditions by using one or more of the said variables.

The control device 2, in particular the diagnostic device 30, is expediently configured to generate, store, output, in particular display and/or transmit pressurized fluid leakage information based on the diagnosed pressurized fluid leakage.

The pressure-fluid leakage information includes, for example, the information that there is a pressurized fluid leakage and/or the cause of the pressurized fluid leakage. In addition, the pressurized fluid leakage information may include a quantitative indication of the extent of the pressurized fluid leakage.

The diagnostic device 30 is expediently configured to calculate, on the basis of the at least one pressure control actuating signal and a characteristic curve information of the valve arrangement 11, an amount of pressurized fluid which has flowed out of the pressure chamber 18 due to the pressurized fluid leakage. The characteristic curve information is in particular characteristic curve information of a (in particular mathematical) model.

Expediently, the characteristic curve information of the valves of the valve arrangement 11 used for the supplying and discharging of air of the pressure chambers 18A, 18B describes a relationship between the signal values of the pressure control actuating signals, pressure ratios and the amount of air flowing through the valves. The amount of air can be, for example, the mass or a volume calculated from the mass under standard conditions. Furthermore, the characteristic curve information can describe a relationship between signal values of the pressure control actuating signals, pressure conditions and a change in air amount caused by the valves. For example, the air amount change can be a mass flow or a volume flow calculated from the mass flow at standard conditions.

Expediently, the diagnostic device 30 is configured to calculate, on the basis of the stored characteristic curve information of the valve arrangement 11 and on the basis of measured pressure values, for example by means of the pressure sensor device 14, what amount of air per unit of time is required to maintain the specified target pressure value in one pressure chamber 18 and/or both pressure chambers 18A, 18B. The diagnostic device 30 is particularly configured to output a quantitative indication of the extent of the pressurized fluid leakage to be compensated, for example by means of a display device, in particular in units which can be grasped by the user. Optionally, the diagnostic device 30 is further configured to provide an estimate of the direct economic effects of the pressurized fluid leakage. Expediently, the fluidic system 10 does not measure a flow in this respect.

Expediently, the diagnostic device 30 is configured to take into account a temperature value measured in particular by means of a temperature sensor (which, for example, is part of the control device 2) when diagnosing the pressurized fluid leakage. The temperature value relates in particular to the temperature of the pressurized fluid in the pressure chambers 18A and/or 18B. The diagnostic device 30 is especially configured to cancel out the influence of temperature on the pressure control actuating signals u1, u2, u3, u4 by taking the temperature value into account. In this way it can be prevented that the determination made by the diagnostic device 30 that there is a pressurized fluid leakage (or that there is no pressurized fluid leakage) is falsified by the temperature of the pressurized fluid.

According to a possible design, the diagnostic device 30, in particular the control device 2, is configured to check, on the basis of the diagnosed pressurized fluid leakage, whether the fluidic system 10 is capable of fulfilling a specified requirement, in particular an application-specific requirement. The specified requirement is, for example, the requirement that the actuator member 15 of the fluidic actuator 3 can be moved according to a time specification to a target position (in particular within specified limits), the target position being preferably specified by the superordinate controller 1. If the pressurized fluid leakage progresses, it may be that it is no longer possible to meet this requirement.

Expediently, the diagnostic device 30 is configured to predict, on the basis of a temporal development of the diagnosed pressurized fluid leakage, a point in time at which the fluidic system 10 will no longer be able to move the actuator member 15 of the fluidic actuator 3 to a specified target position, due to pressurized fluid leakage.

In particular, the diagnostic device 30 is configured to predict, on the basis of a temporal development of the diagnosed pressurized fluid leakage, a point in time at which the actuator member 15 of the fluidic actuator 3, which can be actuated via the application of pressurized fluid to the pressure chamber 18, can no longer be moved into a target position according to at least one specified requirement. The specified requirement is, for example, a time requirement, in particular a minimum time period, within which the actuator member 15 is to be moved into the target position.

As an example, the control device 2 further includes an analog current interface 8. Expediently, the analog current interface 8 is a 4-20 mA analog current interface. The control device 2 is configured to receive a target position value via the analog current interface 8, in particular from the superordinate controller 1. The control device 2 is designed to receive the energy required for operation of the control device 2 via the analog current interface 8. As an example, the control device 2 generates the electrical energy used for its operation from the interface current of the analog current interface 8. In particular, the computer unit 7 and the valve arrangement 11, the position sensor device 12 and/or the pressure sensor device 14 are operated with the electrical energy from the interface current. The interface current is provided by the superordinate controller 1 as an example. The analog current interface 8 is expediently located on or in the housing 6.

The control device 2 is preferably configured to perform a closed-loop position control of the actuator member 15 of the fluidic actuator 3 and to switch from the closed-loop position control to the closed-loop pressure control of the fluidic actuator 3.

As an example, the superordinate controller 1 provides the target position value to the control device 2. The target position value specifies a target position for the actuator member 15. In the closed-loop position control, the control device 2 outputs the pressurized fluid to the one or more pressure chambers 18 via the valve arrangement 11 on the basis of the target position value in order to move the actuator member 15 into a position specified by the target position value and/or to hold it in the position specified by the target position value. The output of the pressurized fluid is based in particular on a comparison of the target position value with the actual position value of the actuator member 15.

Expediently, the control device 2 is configured to perform the closed-loop pressure control of the pressurized fluid on the basis of a target pressure value in response to the fact that the actuator member 15 is located in a position target range specified by the target position value of the closed-loop position control. In particular, the actual pressure value(s) that is/are given when the position target range is reached is/are used as the target pressure value.

Preferably, the control device 2 is configured to deactivate the closed-loop position control in response to the actuator member 15 being within the position target range.

The control device 2 is expediently further configured to disable the closed-loop pressure control in response to the actuator member 15 being outside the position target range.

The control device 2 is in particular configured to switch from the closed-loop position control to the closed-loop pressure control in response to the actuator member 15 being in the position target range. Furthermore, the control device 2 is preferably configured to switch from the closed-loop pressure control to the closed-loop position control in response to the actuator member 15 being outside the position target range.

Preferably, the control device 2 is configured to perform the above described diagnosis of pressurized fluid leakage based on the at least one pressure control actuating signal depending on whether the closed-loop position control or the closed-loop pressure control is active. In particular, the control device 2 is configured to carry out the diagnosis of the pressurized fluid leakage if the closed-loop pressure control is active and is configured not to carry out the diagnosis if the closed-loop position control is active.

It shall be noted that the fluidic system 10 described above is a purely exemplary application of the diagnostic device 30. The diagnostic device 30 can expediently be used to control an actuator member of a different fluidic, in particular pneumatic, actuator, for example to control the piston of an actuator cylinder. According to a possible embodiment, an arrangement comprising the control device 2 and a drive cylinder is provided, the control device 2 being configured to perform a closed-loop control of the piston of the drive cylinder.

What is claimed is:

1. A control device comprising a valve arrangement and a microcontroller for controlling the valve arrangement, the valve arrangement having a plurality of valves and the microcontroller being provided with a diagnostic device, wherein the control device is adapted to perform, via the valve arrangement, a closed-loop pressure control of a pressure chamber and to provide a plurality of pressure control actuating signals for the plurality of valves as part of the closed-loop pressure control, and wherein the diagnostic device is adapted to diagnose leakage of pressurized fluid from the pressure chamber to which a pressurized fluid is applied, the diagnostic device being configured to diagnose the leakage of pressurized fluid on the basis of the plurality of pressure control actuating signals for controlling the valve arrangement.

2. The control device according to claim 1, wherein the diagnostic device is configured to diagnose the leakage of pressurized fluid on the basis of an integral and/or low-pass filtering of the plurality of pressure control actuating signals.

3. The control device according to claim 1, wherein the diagnostic device is configured to diagnose at least one of a plurality of possible causes of pressurized fluid leakage on the basis of the plurality of pressure control actuating signals.

4. The control device according to claim 3, wherein the diagnostic device is configured to distinguish between different causes of pressurized fluid leakage on the basis of the plurality of pressure control actuating signals.

5. The control device according to claim 1, wherein the plurality of pressure control actuating signals comprises a first pressure control actuating signal for controlling a first pressurized fluid supply valve provided for pressurized fluid supply into a first pressure chamber.

6. The control device according to claim 5, wherein the diagnostic device is configured to diagnose, based on the first pressure control actuating signal, a first pressurized fluid leakage cause which comprises a lack of impermeability of the first pressure chamber, a lack of impermeability of a first fluidic connection between the first pressurized fluid supply valve and the first pressure chamber and/or a lack of impermeability of a first pressurized fluid discharge valve provided for pressurized fluid discharge from the first pressure chamber.

7. The control device according to claim 6, wherein the diagnostic device is configured to calculate a first indicator by integrating and/or low-pass filtering the first pressure control actuating signal, and to diagnose, based on the first indicator exceeding a predetermined threshold, the first pressurized fluid leakage cause.

8. The control device according to claim 5, wherein the plurality of pressure control actuating signals comprises a fourth pressure control actuating signal for the control of a second pressurized fluid discharge valve provided for pressurized fluid discharge from a second pressure chamber.

9. The control device according to claim 8, wherein the diagnostic device is configured to diagnose a third pressurized fluid leakage cause based on the first pressure control actuating signal and the fourth pressure control actuating signal, wherein the third pressurized fluid leakage cause comprises a lack of impermeability between the first pressure chamber and the second pressure chamber.

10. The control device according to claim 1, wherein the plurality of pressure control actuating signals comprises a second pressure control actuating signal for controlling a first pressurized fluid discharge valve provided for pressurized fluid discharge from a first pressure chamber.

11. The control device according to claim 10, wherein the diagnostic device is configured to diagnose, based on the second pressure control actuating signal, a second pressurized fluid leakage cause comprising a lack of impermeability of a first pressurized fluid supply valve provided for pressurized fluid supply into the first pressure chamber.

12. The control device according to claim 11, wherein the diagnostic device is configured to calculate a second indicator by integrating and/or low-pass filtering the second pressure control actuating signal, and to diagnose, based on the second indicator exceeding a predetermined threshold, the second pressurized fluid leakage cause.

13. The control device according to claim 1, wherein the diagnostic device is configured to calculate, on the basis of the plurality of pressure control actuating signals and characteristic curve information of the valve arrangement, an amount of pressurized fluid which has flowed out of the pressure chamber due to the pressurized fluid leakage.

14. The control device according to claim 1, wherein the diagnostic device is configured to predict, on the basis of a temporal development of the diagnosed pressurized fluid leakage, a point in time at which an actuator member of a fluidic actuator, which can be actuated via pressurized fluid supply to the pressure chamber, can no longer be moved into a specified target position in accordance with at least one specified requirement.

15. The control device according to claim 1, wherein the control device is configured to perform a closed-loop position control of an actuator member of a fluidic actuator, and is configured to switch from the closed-loop position control to the closed-loop pressure control of the fluidic actuator.

16. A fluidic system comprising a control device according to claim 1 and a fluidic actuator, wherein the control device is configured to perform a closed-loop pressure control of the fluidic actuator and to provide, within the closed-loop pressure control, at least one electrical pressure control actuating signal for the actuation of the valve arrangement, and the diagnostic device is configured to diagnose pressurized fluid leakage on the basis of the at least one electrical pressure control actuating signal.

17. The control device according to claim 1, further comprising a housing, wherein the valve arrangement comprises at least four valves, and the four valves and the microcontroller are located in the housing, wherein the plurality of pressure control actuating signals comprises at least four pressure control actuating signals, wherein each pressure control actuating signal serves to control a respective one of the four valves.

* * * * *